US007937526B1

(12) United States Patent
Sutardja (10) Patent No.: US 7,937,526 B1
(45) Date of Patent: May 3, 2011

(54) STORAGE DEVICE CACHE WITH PHASE CHANGE MEMORY

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 812 days.

(21) Appl. No.: 11/986,520

(22) Filed: Nov. 21, 2007

Related U.S. Application Data (60) Provisional application No. 60/947,182, filed on Jun. 29, 2007.

(51) Int. Cl.
*G06F 12/00* (2006.01)

(52) U.S. Cl. ........................................ 711/113

(58) Field of Classification Search .................. None
See application file for complete search history.

(56) References Cited

U.S. PATENT DOCUMENTS 7,782,731 B2 * 8/2010 Henrichs ........................ 369/95
2009/0089500 A1 * 4/2009 Jiang ............................. 711/113

* cited by examiner

*Primary Examiner* — Brian R Peugh (57) ABSTRACT

A hard disk drive (HDD) is disclosed that includes a hard disk control (HDC) module and phase change memory (PCM). The PCM communicates with the HDC module and includes a plurality of memory cells that store data. Each of the memory cells includes a phase change material having N states. N is an integer greater than or equal to three. The HDC module caches at least one of user data and a computer program, which is stored by a magnetic storage medium that is associated with the HDD, in the PCM.

51 Claims, 7 Drawing Sheets

STORAGE DEVICE CACHE WITH PHASE CHANGE MEMORY

CROSS-REFERENCE TO RELATED APPLICATIONS

This application claims the benefit of U.S. Provisional Application No. 60/947,182 filed on Jun. 29, 2007. The disclosure of the above application is incorporated herein by reference in its entirety.

FIELD

The present disclosure relates to mass storage devices that include a non-volatile memory cache, and more specifically to in-situ detection of an end-of-service life of the non-volatile memory.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
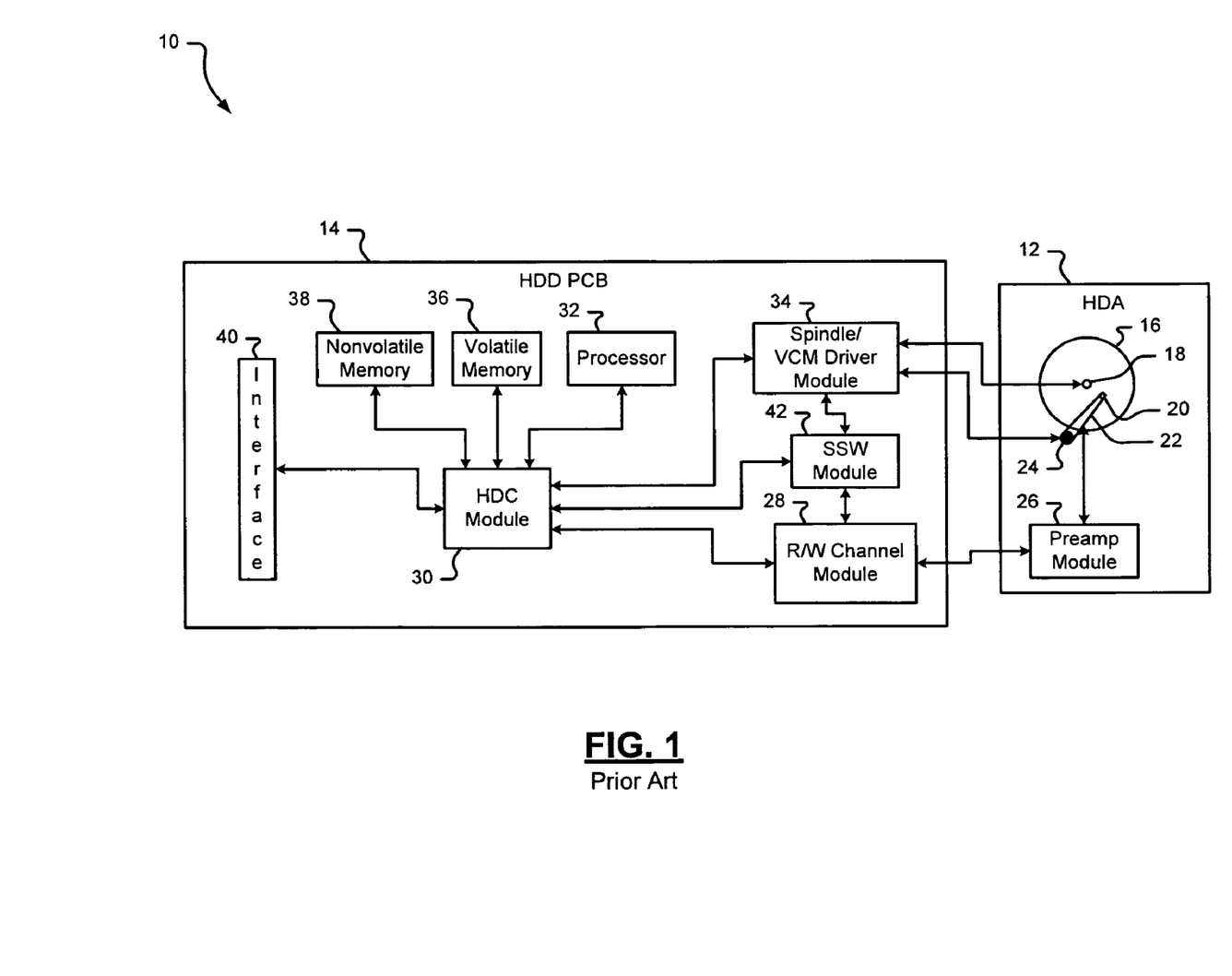
FIG. 1 is a functional block diagram of a hard disk drive (HDD) in accordance with the prior art.

Referring now to FIG. 1, a hard disk drive (HDD) 10 includes a hard disk assembly (HDA) 12 and a HDD printed circuit board (PCB) 14. PCB 14 provides mounting points and electrical connections for various modules of HDD 10 that are described herein. HDA 12 includes one or more platters 16 that are coated with magnetic material for storing data. Platters 16 are arranged in a concentric stack that is rotated by a spindle motor 18. Read/write heads 20 read and write data to and from corresponding surfaces of platters 16. Heads 20 are mounted at ends of corresponding actuator arms 22. A voice coil motor (VCM) 24 moves actuator arms 22 to position heads 20 over desired data tracks on platters 16.

A preamplifier module 26 amplifies signals from heads 20 and communicates the amplified signals to a read/write channel module 28. Read/write channel module 28 performs analog-to-digital (A2D) and digital-to-analog (D2A) conversions on the data that is communicated with HDA 12.

Platters 16 include servo data that is written on platters 16 at predetermined locations and provide reference points for locating the data tracks on platters 16. In some implementations a self-servo write (SSW) module 42 generates the servo data before data can be stored on platters 16.

A hard drive control (HDC) module 30 controls operation of HDD 10. For example, HDC module 30 generates commands that control the rotational speed of spindle motor 18 and the position of arms 22 over selected tracks of platters 16. Based on the commands, a spindle/VCM driver module 34 generates control signals that control the speed of spindle motor 18 and the positions of VCM 24 and actuator arms 22.

HDC module 30 communicates the data stored in HDA 12 with an external device (not shown) via an interface 40. Examples of external devices include computers, televisions, set top boxes, digital video recorders, personal digital assistants, cellular phones, media or MP3 players, and the like. Interface 40 may include a wired and/or a wireless communication link that is compatible with wireless local area network (WLAN), Ethernet, advanced technology attachment (ATA), serial ATA (SATA), integrated drive electronics (IDE), enhanced IDE (EIDE), small computer system interface (SCSI), Peripheral Component Microchannel Interconnect Architecture (PCMCIA), peripheral component interconnect (PCI), extended PCI (PCIx), enhanced PCI (PCIe), and the like.

A processor 32 processes the data to implement functions such as data encoding, decoding, filtering, and/or formatting and the like. Processor 32 may also process the servo data to facilitate positioning heads 20 over a selected one of the data tracks on platters 16.

HDC module 30 can use volatile memory 36 and/or flash memory 38 to cache data that passes through interface 40. Volatile memory 36 may include dynamic random access memory (DRAM), synchronous DRAM (SDRAM), Rambus (DRAM), static RAM, and the like. Flash memory 38 has a finite life span and can render HDD 10 inoperative when non-volatile memory 38 reaches its end-of-service life. In some embodiments flash memory 38 has a life span of about $1\times10^5$ or $1\times10^6$ write cycles.

Using flash memory 38 to cache data waiting to be written to HDA 12 or read by interface 40 has a number of possible benefits. These benefits include faster access time, higher transfer rate, power savings, quicker resumption from a hibernate state, and greater reliability. Data read from HDA 12 or not yet written to HDA 12 can be accessed more quickly from flash memory 38 than from HDA 12.

Further, data can be accessed from flash memory 38 without having to power HDA 12 and spin platters 16. HDA 12 may then only require power intermittently to provide read data to flash memory 38 and flush write data from nonvolatile memory 38. While platters 16 are not rotating, HDA 12 is much less prone to physical damage, such as from drops or sudden impacts.

SUMMARY

A hard disk drive (HDD) is disclosed that includes a hard disk control (HDC) module and phase change memory (PCM). The PCM communicates with the HDC module and includes a plurality of memory cells that store data. Each of the memory cells includes a phase change material having N states. N is an integer greater than or equal to three. The HDC module caches at least one of user data and a computer program, which is stored by a magnetic storage medium that is associated with the HDD, in the PCM.

In other features the HDD includes a hard disk assembly that includes the magnetic storage medium. The phase change material is programmed by heating and the N states correspond with N resistance ranges. The HDD includes an interface that communicates data between the HDC module and a host. The user data includes at least one of a music file, a video file, an e-mail message, a text document, and a spreadsheet data file. The computer program includes at least one of a boot program, a music player program, a video coder/decoder program, an e-mail editing program, a text editing program, and a spreadsheet program.

In other features the HDC module switches the hard disk assembly between a full power mode and a low power mode. The HDC module switches the hard disk assembly to the full power mode to retrieve the at least one of the user data and the computer program from the magnetic storage medium and switches the hard disk assembly to the low power mode when the at least one of the user data and the computer program is cached in the PCM.

In other features the HDD includes a life monitor module that writes data to the plurality of memory cells at each of said N resistance states, reads resistance values of said data at each of said N resistance states, compares said resistance values to thresholds corresponding to said N resistance states, and generates a PCM life estimate signal based on said comparisons. The HDC module suspends caching the at least one of the user data and the computer program in the PCM based on the PCM life estimate signal. The life monitor module monitors the plurality of memory cells when the at least one of the user data and the computer program is cached.

In other features the HDD includes second memory. The HDC module selectively caches the at least one of the user data and the computer program data in the second memory based on the PCM life estimate signal. The second memory includes volatile memory. At least two of the HDC module, the PCM, and the life monitor module are integrated in a system-on-chip.

In other features the HDD includes a wear leveling module that distributes successive memory write operations substantially uniformly across the plurality of memory cells. A static data shifting module selectively relocates first data within first ones of the plurality of memory cells when the first data changes less frequently than other data within other ones of the plurality of memory cells.

A hard disk drive (HDD) is disclosed that includes a hard disk control (HDC) module and phase change memory (PCM) that communicates with the HDC module. The PCM includes a plurality of memory cells that store data. Each of the memory cells includes a phase change material having N resistance states where N is an integer greater than or equal to three. A life monitor module writes data to the plurality of memory cells at each of said N resistance states, reads resistance values of said data at each of said N resistance states, compares said resistance values to thresholds corresponding to said N resistance states, and generates a PCM life estimate signal based on said comparisons.

In other features the HDD includes an interface that communicates data between the HDC module and a host. At least two of the HDC module, the interface, the PCM, and the life monitor module are integrated in a system-on-chip. The HDC module selectively suspends caching data in the PCM based upon the PCM life estimate signal.

In other features the HDD includes a wear leveling module that distributes successive memory write operations substantially uniformly across the plurality of memory cells. The HDD includes a static data shifting module that selectively relocates first data within first ones of the plurality of memory cells when the first data changes less frequently than other data within other ones of the plurality of memory cells. The life monitor module monitors the plurality of said memory cells on at least one of an event basis, after a predetermined amount of time has passed, and after a predetermined number of memory writes have been performed.

In other features the HDD includes second memory. The HDC module selectively caches data in the second memory when the PCM is disabled. The second memory includes volatile memory. The user data includes at least one of music data, video data, e-mail message data, text document data, and spreadsheet data.

A method of operating a hard disk drive (HDD) is disclosed. The method includes storing at least one of user data and a computer program on a magnetic storage medium and caching the at least one of user data and the computer program in a phase change memory (PCM). The PCM includes a plurality of memory cells that store the at least one of the user data and the computer program. Each of the memory cells includes a phase change material having N states. N is an integer greater than or equal to three.

In other features the method includes providing a hard disk assembly that includes the magnetic storage medium. The method includes programming the phase change material by heating. The N states correspond with N resistance ranges. The method includes communicating the at least one of user data and the computer program between the PCM and a host. The user data includes at least one of a music file, a video file, an e-mail message, a text document, and a spreadsheet data file. The computer program includes at least one of a boot program, a music player program, a video coder/decoder program, an e-mail editing program, a text editing program, and a spreadsheet program.

In other features the method includes switching the hard disk assembly between a full power mode and a low power mode. The method includes switching the hard disk assembly to the full power mode to retrieve the at least one of the user data and the computer program from the magnetic storage medium and switching the hard disk assembly to the low power mode when the at least one of the user data and the computer program is cached in the PCM.

In other features the method includes writing data to the plurality of memory cells at each of said N resistance states, reading resistance values of said data at each of said N resistance states, comparing said resistance values to thresholds corresponding to said N resistance states, and generating a PCM life estimate, signal based on said comparisons. The method includes suspending caching the at least one of the user data and the computer program in the PCM based on the phase change memory life-estimate signal. The writing, reading and comparing occurs while the at least one of the user data and the computer program is cached.

In other features the method includes selectively caching the at least one of the user data and the computer program data in a second memory based on the PCM life estimate signal. The second memory includes volatile memory. The method includes integrating the PCM in a system-on-chip for controlling the magnetic storage medium.

In other features the method includes distributing successive memory write operations substantially uniformly across the plurality of memory cells. The method includes selectively relocating first data within first ones of the plurality of memory cells when the first data changes less frequently than other data within other ones of the plurality of memory cells.

A method of operating a hard disk drive (HDD) is disclosed. The method includes storing at least one of user data and a computer program on a magnetic storage medium and caching the at least one of user data and the computer program in a phase change memory (PCM). The PCM includes a plurality of memory cells that store the at least one of the user data and the computer program. Each of the memory cells includes a phase change material having N states. N is an integer greater than or equal to three. The method includes writing data to the plurality of memory cells at each of said N resistance states, reading resistance values of said data at each of said N resistance states, comparing said resistance values to thresholds corresponding to said N resistance states, and generating a PCM life estimate signal based on said comparing.

In other features the method includes communicating the at least one of user data and the computer program between the PCM and a host. The method includes integrating the PCM in a system-on-chip for controlling the magnetic storage medium. The method includes selectively caching data in the PCM based upon the PCM life estimate signal. The method includes distributing successive memory write operations substantially uniformly across the plurality of memory cells. The method includes selectively relocating first data within first ones of the plurality of memory cells when the first data changes less frequently than other data within other ones of the plurality of memory cells. The method includes monitoring the plurality of said memory cells on at least one of an event basis, after a predetermined amount of time has passed, and after a predetermined number of memory writes have been performed. The method includes selectively caching the at least one of the user data and the computer program in a second memory when the PCM is disabled. The second memory includes volatile memory. The user data includes at least one of music data, video data, e-mail message data, text document data, and spreadsheet data.

A hard disk drive (HDD) is disclosed that includes hard disk control (HDC) means for controlling a hard disk assembly and phase change memory (PCM) means for communicating with the HDC means. The PCM means includes a plurality of memory cell means for storing data. Each of the memory cell means includes a phase change material having N states. N is an integer greater than or equal to three. The HDD means caches at least one of user data and a computer program, which is stored by a magnetic storage medium that is associated with the hard disk assembly, in the PCM means.

In other features the HDD includes the hard disk assembly that includes the magnetic storage medium. The phase change material is programmed by heating and the N states correspond with N resistance ranges. The HDD includes interface means for communicating data between the HDC means and a host means for processing the data. The user data includes at least one of a music file, a video file, an e-mail message, a text document, and a spreadsheet data file. The computer program includes at least one of a boot program, a music player program, a video coder/decoder program, an e-mail editing program, a text editing program, and a spreadsheet program.

In other features the HDC means switches the hard disk assembly between a full power mode and a low power mode. The HDC means switches the hard disk assembly to the full power mode to retrieve the at least one of the user data and the computer program from the magnetic storage medium and switches the hard disk assembly to the low power mode when the at least one of the user data and the computer program is cached in the PCM. The HDD includes life monitor means for writing data to the plurality of memory cells at each of said N resistance states, reading resistance values of said data at each of said N resistance states, comparing said resistance values to thresholds corresponding to said N resistance states, and generating a PCM life estimate signal based on said comparisons. The HDC means suspends caching the at least one of the user data and the computer program in the PCM based on the PCM life estimate signal. The life monitor means monitors the plurality of memory cells when the at least one of the user data and the computer program is cached.

In other features the HDD includes second memory means for storing data. The HDC means selectively caches the at least one of the user data and the computer program data in the second memory means based on the PCM life estimate signal. The second memory means includes volatile memory. At least two of the HDC means, the PCM means, and the life monitor means are integrated in a system-on-chip means for integrating electronic circuits.

In other features the HDD includes wear leveling means for distributing successive memory write operations substantially uniformly across the plurality of memory cells. The HDD includes static data shifting means for selectively relocating first data within first ones of the plurality of memory cells when the first data is changed less frequently than other data within other ones of the plurality of memory cells.

A hard disk drive (HDD) is disclosed that includes hard disk control (HDC) means for controlling a hard disk assembly phase change memory (PCM) means for communicating with the HDC means. The PCM means includes a plurality of memory cells that store data. Each of the memory cells includes a phase change material having N resistance states. N is an integer greater than or equal to three. The HDD includes life monitor means for writing data to the plurality of memory cells at each of said N resistance states, reading resistance values of said data at each of said N resistance states, comparing said resistance values to thresholds corresponding to said N resistance states, and generating a PCM life estimate signal based on said comparisons.

In other features the HDD includes interface means for communicating data between the HDC means and host means for processing the data. At least two of the HDC means, the interface means, the PCM means, and the life monitor means are integrated in a system-on-chip means for integrating electronics. The HDC means selectively suspends caching data in the PCM means based upon the PCM life estimate signal.

The HDD includes wear leveling means for distributing successive memory write operations substantially uniformly across the plurality of memory cells. The HDD includes static data shifting means for selectively relocates first data within first ones of the plurality of memory cells when the first data is changed less frequently than other data within other ones of the plurality of memory cells. The life monitor means monitors the plurality of said memory cells on at least one of an event basis, after a predetermined amount of time has passed, and after a predetermined number of memory writes have been performed.

In other features the HDD includes second memory means for storing data. The HDC means selectively caches data in the second memory means when the PCM means is disabled. The second memory means includes volatile memory. The user data includes at least one of music data, video data, e-mail message data, text document data, and spreadsheet data.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit, and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
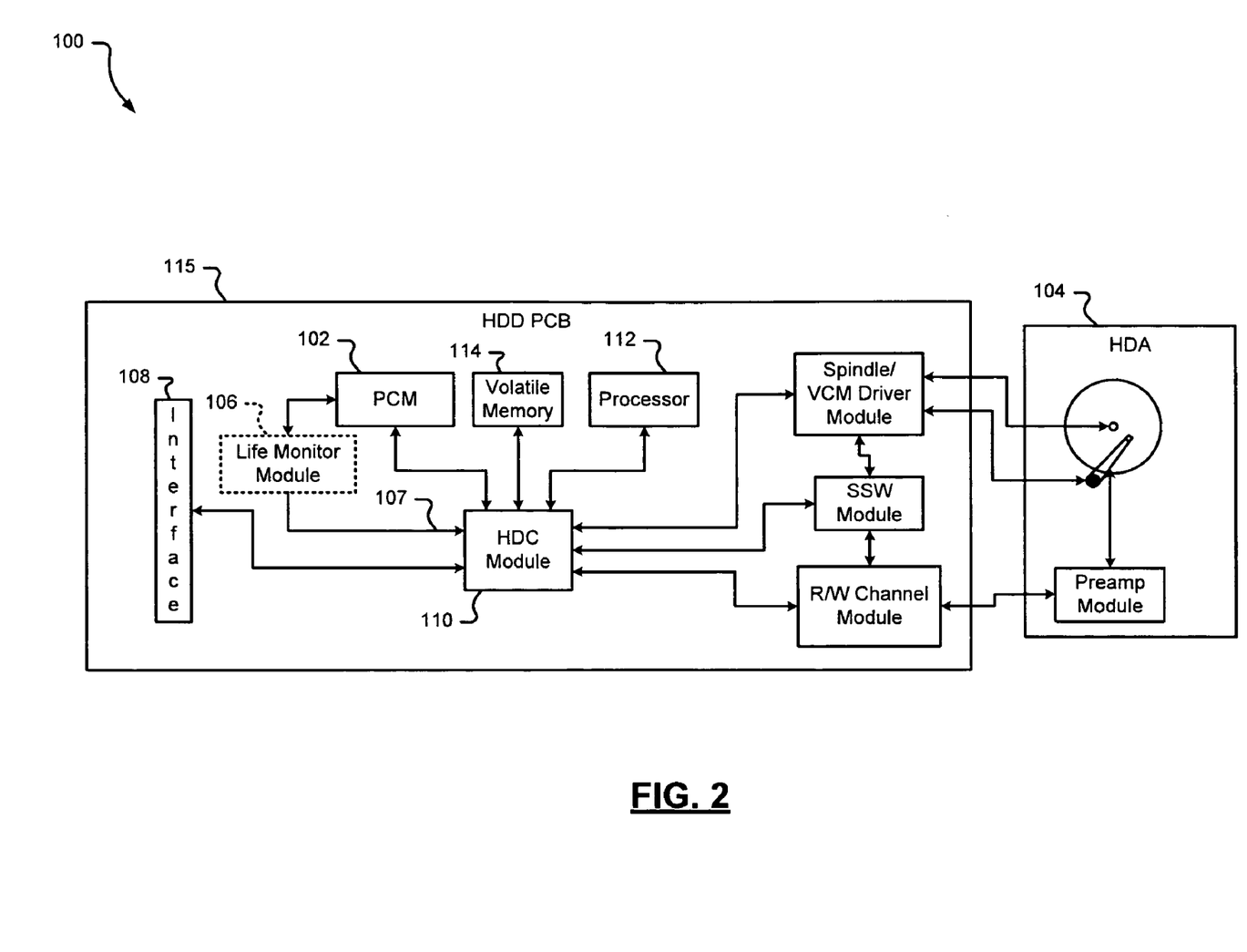
FIG. 2 is a functional block diagram of a HDD that includes a phase-change memory (PCM) cache.

Referring now to FIG. 2, a functional block diagram of an exemplary mass storage device according to the principles of the present disclosure is presented. For purposes of explanation, the mass storage device is shown as a hard disk drive (HDD) 100 however, it should be appreciated that the mass storage device may also comprise tape drives, optical drives such as compact disc (CD) or digital versatile disc (DVD) drives, network attached storage (NAS) devices, storage devices comprising high-latency nonvolatile memory, etc.

HDD 100 includes phase change memory (PCM) 102 that can cache data and/or computer instructions that are read from and/or written to a hard disk assembly (HDA) 104. PCM 102 may have a finite life span and is therefore monitored by a life monitor module 106. Life monitor module 106 employs a method 300, which is described below in more detail, to detect changes in the electrical properties of PCM 102 and thereby determine when it has reached its end-of-service life. Life monitor module 106 generates a PCM life estimate signal 107 that indicates conditions of PCM 102 to HDC module 110.

By some estimates the life span of PCM 102 may be greater than $1 \times 10^{12}$ write cycles. PCM 102 therefore has sufficient lifespan to cache user data and/or computer programs, collectively referred to as data. Examples of user data include music files, video files, e-mail messages, text documents, spreadsheet data, and the like. Examples of computer programs include boot routines, music player programs, video coder/decoder (codec) programs, e-mail editing programs, text editing programs, spreadsheet programs, and the like. User data generally flows between an interface 108 and HDA 104 more frequently than the computer programs. User data therefore can be expected to be cached more frequently than the computer programs and consume a greater portion of the expected life span of PCM 102.

HDA 104 can be switched to a low power mode after PCM 102 caches the data. Examples of low power modes for HDA 104 include reducing the speed or stopping the spindle motor, turning off the voice coil motor, turning off the preamplifier module, and the like.

HDD 100 communicates with a host (not shown) via interface 108. In some embodiments interface 108 can be compatible with one or more interface types such as wireless local area network (WLAN), Ethernet, advanced technology attachment (ATA), serial ATA (SATA), integrated drive electronics (IDE), enhanced IDE (EIDE), small computer system interface (SCSI), Peripheral Component Microchannel Interconnect Architecture (PCMCIA), peripheral component interconnect (PCI), extended PCI (PCIx), enhanced PCI (PCIe), and the like. Interface 108 communicates with a hard disk control (HDC) module 110.

HDC module 110 communicates the data between interface 108 and HDA 104 and may cache at least a portion of the data in PCM 102. In some embodiments HDC module 110 reads the data from HDA 104 and caches the data in PCM 102. In some embodiments HDC module 110 reads the data from interface 108 and caches the data in PCM 102. HDC module 110 can communicate with a processor 112 that encodes, decodes, filters, error corrects and/or formats the data that is stored in HDA 104. HDC module 110 communicates with life monitor module 106 to determine whether PCM 102 is still reliable.

HDC module 110 may also communicate with volatile memory 114. Volatile memory 114 can store program variables for HDC module 110 and/or processor 112. Volatile memory 114 can also be used to cache the data in a manner similar to that employed with PCM 102.

Using PCM 102 as cache provides benefits that include faster access time and possible power savings when compared to communicating the data with HDA 104 without caching. The data stored in PCM 102 can be accessed by the host more quickly than if the data were retrieved from HDA 104. Once PCM 102 has reached its end-of-service life, however, HDD 100 may forego the performance benefit of caching by deactivating PCM 102. Foregoing the performance benefit can be preferable to allowing HDD 100 to simply fail due to the unreliability of aged PCM 102. HDC module 110 may also switch off power to PCM 102 when PCM 102 has reached end-of-life.

Life monitor module 106 determines when one or more cells 142 (see FIG. 3) within PCM 102 have reached the end of their usable lifetimes. HDC module 110 can coordinate deactivating the expired cells without corrupting the data in the process. HDC module 110 may use volatile memory 114 or a spare PCM (not shown) as cache memory when PCM 102 reaches its end-of-life. Life monitor module 106 may also be implemented within PCM 102, as part of HDC module 110 or as a subroutine executed by processor 112.

HDC module 110, life monitor module 106, PCM 102, volatile memory 114, processor 112, a spindle/VCM driver module, a SSW module, and/or a R/W channel module can be included on a printed circuit board (PCB) 115. In some embodiments PCB 115 can be replaced with or include a system-on-chip.

Figure 3:
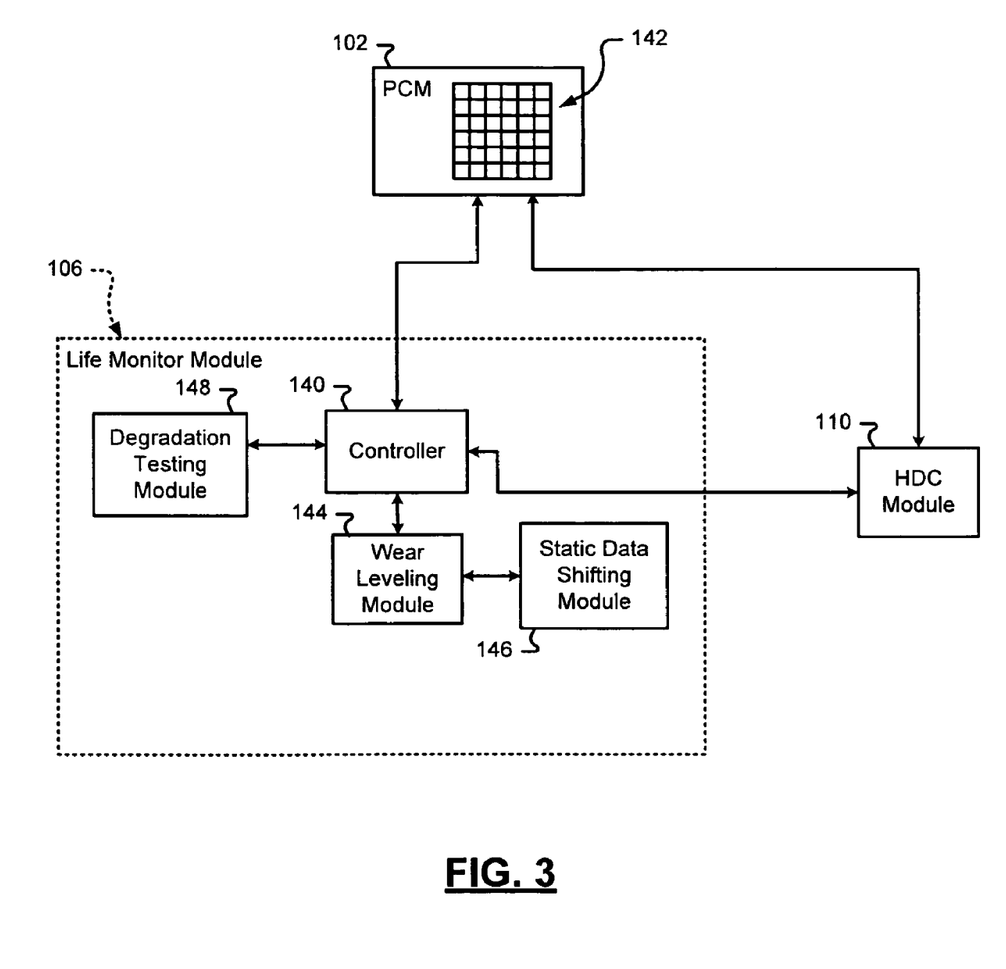
FIG. 3 is a functional block diagram of a life monitor module for the PCM.

Referring now to FIG. 3, a functional block diagram is shown of life monitor module 106. Life monitor module 106 includes a controller 140 that communicates with PCM 102 and HDC module 110. Life monitor module 106 can be incorporated with PCM 102.

PCM 102 includes an array of high-density memory cells 142. Each cell 142 can be programmed to at least three unique resistance levels and therefore stores more than one bit of the data. A plurality of cells 142 can be employed to store nibbles, bytes, or even larger units of the data. Each cell 142 can be programmed or erased independently of other cells 142. Each program or erase cycle heats the associated cell 142 and degrades its performance slightly. At some point the cumulative effect of many program and erase cycles can cause a cell 142 to degrade to where the at least three unique resistance levels approach a common value and therefore cannot be measured reliably. At this point a cell 142 has reached its end-of-service life.

Life monitor module 106 may include a wear leveling module 144, a static data shifting module 146, and/or a degradation testing module 148 that communicate with controller 140. Wear leveling module 144 distributes program/erase cycles among cells 142 as evenly as possible. Wear leveling module 144 may accomplish this distribution by keeping track of the program/erase cycles for cells 142 and directing new data to be written to cells 142 that have been programmed less frequently than others. Wear leveling module 144 may also employ a process that pseudo-randomly spreads the programming cycles among cells 142.

Wear leveling module 144 may communicate with a static data shifting module 146. Static data shifting module 146 tracks cells 142 that hold data that is not altered frequently when compared to other cells 142. When some of the data does not change frequently, wear leveling module 144 does not have adequate opportunity to use those sections to write new data. In other words, cells 142 that contain static data will experience fewer program/erase cycles and thereby can cause other cells 142 to be overused and therefore reach their end-of-service lives prematurely. Static data shifting module 146 reduces this problem by forcing static data to be moved into cells 142 that have been used more frequently. Static data shifting module 146 may perform this task when controller 140 is otherwise idle, when the static data shifting module 146 determines that program/erase cycles are becoming too imbalanced between cells 142, or at periodic intervals. The periodic intervals may be in units of time, number of memory operations, or any other independent variable that may be believed to affect the end-of-service life of cells 142.

Controller 146 may communicate with a degradation testing module 148. Degradation testing module 148 uses a method that is described below to determine whether cells 142 have reached their end-of-service life. Controller 146 can generate messages based on information from degradation testing module 148 and communicate the messages to HDC module 110. The messages can indicate the addresses of cells 142 that have been removed from service. HDC module 110 can then continue to use PCM 102 while avoiding writing to the address of cells 142 that are out-of service.

Figure 4:
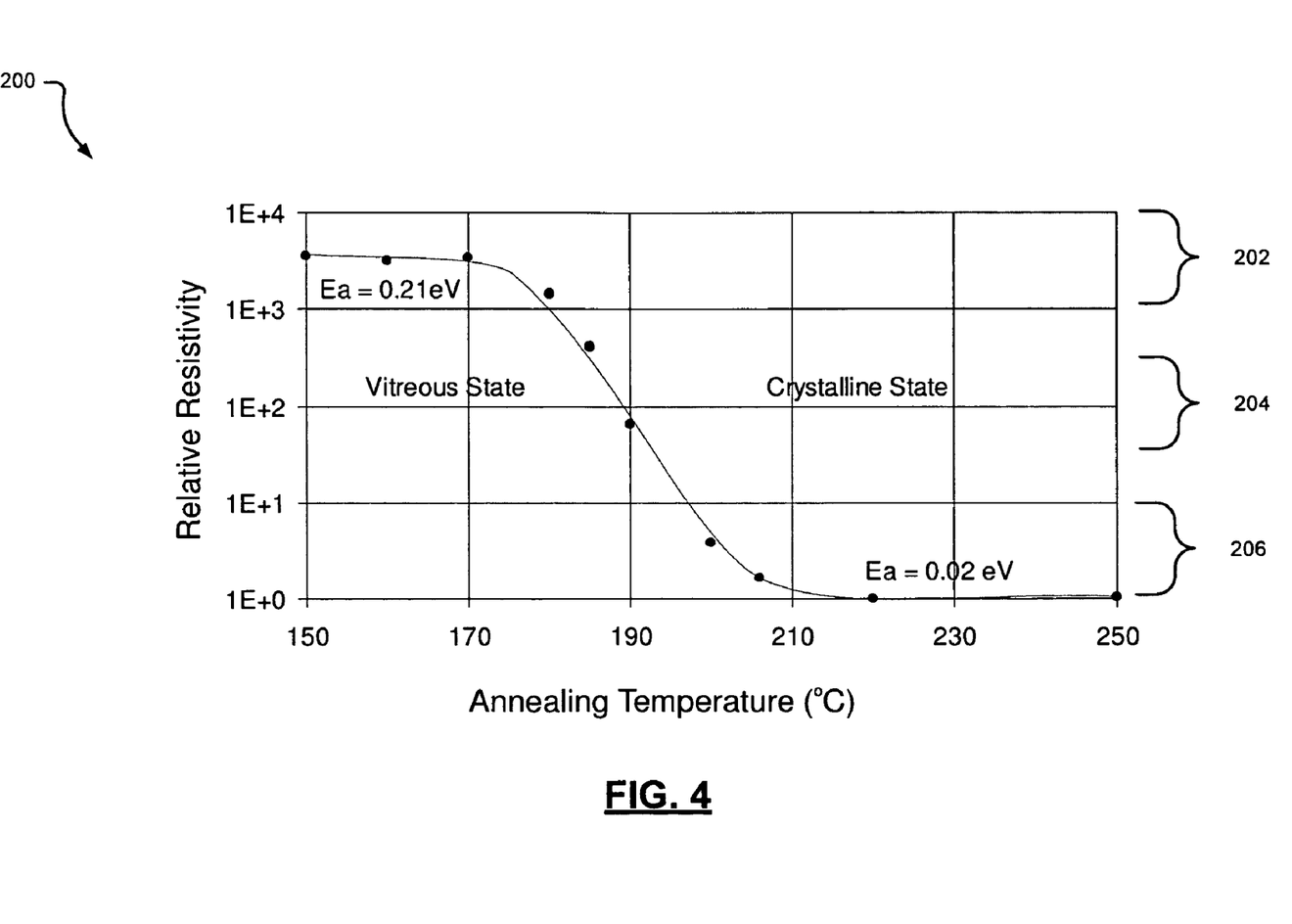
FIG. 4 is a graph of relative resistances of a PCM cell.

Referring now to FIG. 4, a graph 200 shows an example of relative resistance values that are possible for each cell 142. The vertical axis indicates a relative resistance of a cell 142 and the horizontal axis indicates an annealing temperature. Graph 200 shows that the resistance of a cell 142 is based on the annealing temperature. The various resistance levels can represent digital data such as ones and zeros.

For a cell 142 to be considered reliable it must at least be able to be programmed to a selected one of a first resistance range 202, a second resistance range 204, and a third resistance range 206. Other embodiments can have more resistance ranges. Each resistance range corresponds with a unique value of the data.

Figure 5:
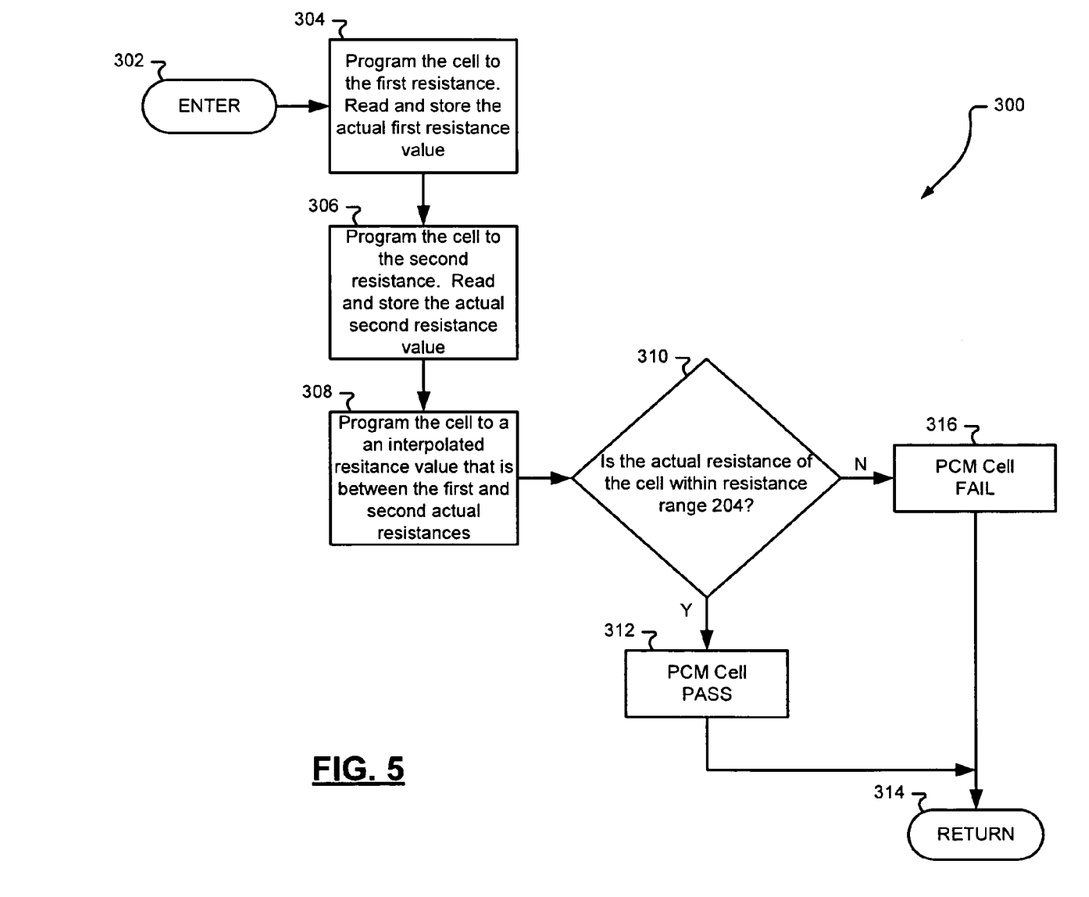
FIG. 5 is a flowchart of a method for determining whether a PCM cell has reached an end-of-service life.

Referring now to FIG. 5, a method 300 is shown that can be used to determine whether a cell 142 is reliable. Method 300 can be executed by life monitor module 106. Method 300 can also be executed by HDC module 110 and communicate results to life monitor module 106. Method 300 can be executed periodically, at power up, and/or each time new data is written to a cell 142.

Control begins at block 302 and immediately proceeds to block 304. In block 304 control programs a cell 142 with data that corresponds with first resistance 202. In block 304 control also reads from the programmed cell 142 and stores the actual value of first resistance 202.

Control then proceeds to block 306 and programs the same cell 142 with data that corresponds with third resistance 206. In block 306 control also reads from the cell 142 and stores the actual value of third resistance 206.

Control then proceeds to block 308 to determine if the programmed cell 142 has sufficient span to remain in service. In block 308 control interpolates a resistance value between the actual values of first resistance 202 and third resistance 206 that were stored in the previous blocks. Control also attempts to program cell 142 to the interpolated resistance value.

Control then proceeds to decision block 310 and again reads the actual resistance from the programmed cell. If the actual resistance is within the second resistance range 204 then control proceeds to block 312 and indicates via signal 107 that the selected cell 142 is functional and exits through block 314. On the other hand, if decision block 310 shows that the actual resistance value is outside of second resistance range then control proceeds to block 316. In block 316 control indicates via signal 107 that the selected cell 142 has reached the end of its service life and exits via block 314. Life monitor module 106 can remove from service those cells 142 that have reached their end-of-service life. Life monitor module 106 can also communicate, via signal 107, the addresses of cells 142 that have been removed from service.

Figure 6A:
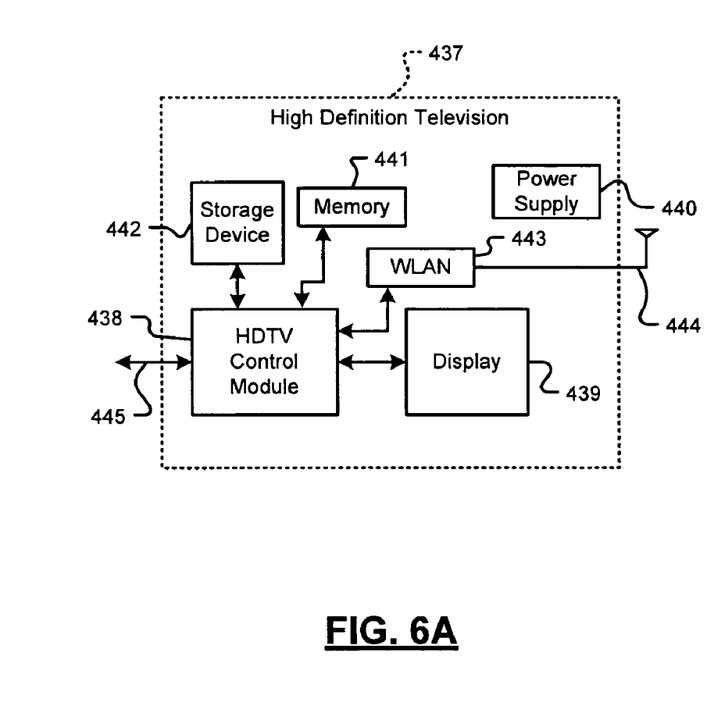
FIG. 6A is a functional block diagram of a high definition television.

Referring now to FIGS. 6A-6D, various exemplary implementations incorporating the teachings of the present disclosure are shown. Referring now to FIG. 6A, the teachings of the disclosure can be implemented in a storage device 442 of a high definition television (HDTV) 437. The HDTV 437 includes a HDTV control module 438, a display 439, a power supply 440, memory 441, the storage device 442, a WLAN interface 443 and associated antenna 444, and an external interface 445.

The HDTV 437 can receive input signals from the WLAN interface 443 and/or the external interface 445, which sends and receives information via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the WLAN interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the WLAN interface 443 and/or the external interface 445. The power supply 440 provides power to the components of the HDTV 437.

Figure 6B:
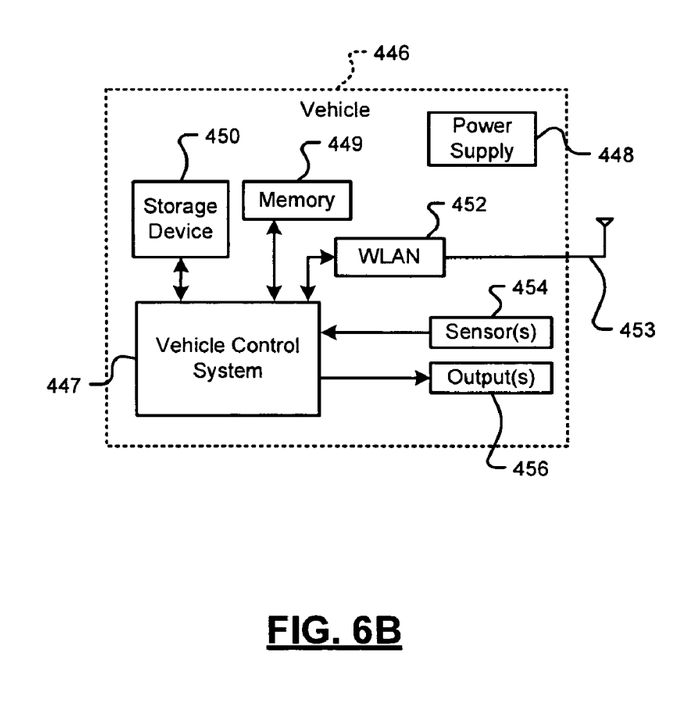
FIG. 6B is a functional block diagram of a vehicle control system.

Referring now to FIG. 6B, the teachings of the disclosure may be implemented in a storage device 450 of a vehicle 446. The vehicle 446 may include a vehicle control system 447, a power supply 448, memory 449, the storage device 450, and a WLAN interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WLAN interface 452.

Figure 6C:
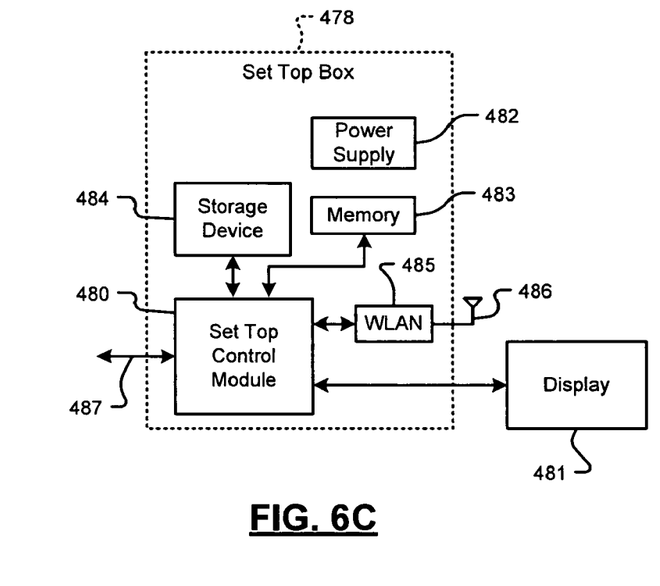
FIG. 6C is a functional block diagram of a set top box.

Referring now to FIG. 6C, the teachings of the disclosure can be implemented in a storage device 484 of a set top box 478. The set top box 478 includes a set top control module 480, a display 481, a power supply 482, memory 483, the storage device 484, and a WLAN interface 485 and associated antenna 486.

The set top control module 480 may receive input signals from the WLAN interface 485 and an external interface 487, which can send and receive information via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the WLAN interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 6D:
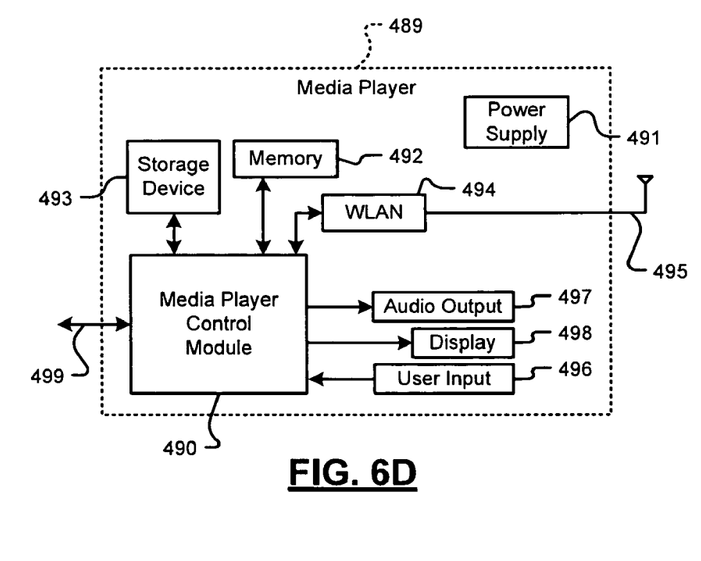
FIG. 6D is a functional block diagram of a mobile device.

Referring now to FIG. 6D, the teachings of the disclosure can be implemented in a storage device 493 of a mobile device 489. The mobile device 489 may include a mobile device control module 490, a power supply 491, memory 492, the storage device 493, a WLAN interface 494 and associated antenna 495, and an external interface 499.

The mobile device control module 490 may receive input signals from the WLAN interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A hard disk drive (HDD) comprising:
a hard disk control (HDC) module; and
phase change memory (PCM) that communicates with the HDC module and that includes a plurality of memory cells that store data, wherein each of the memory cells includes a phase change material having N states, wherein N is an integer greater than or equal to three,
wherein the HDC module caches at least one of user data and a computer program, which is stored by a magnetic storage medium that is associated with the HDD, in the PCM.

2. The HDD of claim 1 further comprising a hard disk assembly that includes the magnetic storage medium.

3. The HDD of claim 2 wherein the HDC module switches the hard disk assembly between a full power mode and a low power mode.

4. The HDD of claim 3 wherein the HDC module switches the hard disk assembly to the full power mode to retrieve the at least one of the user data and the computer program from the magnetic storage medium and switches the hard disk assembly to the low power mode when the at least one of the user data and the computer program is cached in the PCM.

5. The HDD of claim 1 wherein the phase change material is programmed by heating and the N states correspond with N resistance ranges.

6. The HDD of claim 1 further comprising an interface that communicates data between the HDC module and a host.

7. The HDD of claim 1 wherein the user data includes at least one of a music file, a video file, an e-mail message, a text document, and a spreadsheet data file.

8. The HDD of claim 1 wherein the computer program includes at least one of a boot program, a music player program, a video coder/decoder program, an e-mail editing program, a text editing program, and a spreadsheet program.

9. The HDD of claim 1 further comprising a life monitor module that writes data to the plurality of memory cells at each of the N resistance states, reads resistance values of the data at each of the N resistance states, compares the resistance values to thresholds corresponding to the N resistance states, and generates a PCM life estimate signal based on the comparisons.

10. The HDD of claim 9 wherein the HDC module suspends caching the at least one of the user data and the computer program in the PCM based on the PCM life estimate signal.

11. The HDD of claim 9 wherein the life monitor module monitors the plurality of memory cells when the at least one of the user data and the computer program is cached.

12. The HDD of claim 9 further comprising second memory, wherein the HDC module selectively caches the at least one of the user data and the computer program in the second memory based on the PCM life estimate signal.

13. The HDD of claim 12 wherein the second memory includes volatile memory.

14. The HDD of claim 9 wherein at least two of the HDC module, the PCM, and the life monitor module are integrated in a system-on-chip.

15. The HDD of claim 1 further comprising a wear leveling module that distributes successive memory write operations substantially uniformly across the plurality of memory cells.

16. The HDD of claim 1 further comprising a static data shifting module that selectively relocates first data within first ones of the plurality of memory cells when the first data changes less frequently than other data within other ones of the plurality of memory cells.

17. A hard disk drive (HDD), comprising:
a hard disk control (HDC) module;
phase change memory (PCM) that communicates with the HDC module and that includes a plurality of memory cells that store data, wherein each of the memory cells includes a phase change material having N resistance states where N is an integer greater than or equal to three; and a life monitor module that writes data to the plurality of memory cells at each of the N resistance states, reads resistance values of the data at each of said N resistance states, compares the resistance values to thresholds corresponding to the N resistance states, and generates a PCM life estimate signal based on the comparisons.

18. The HDD of claim 17 further comprising an interface that communicates data between the HDC module and a host.

19. The HDD of claim 18 wherein at least two of the HDC module, the interface, the PCM, and the life monitor module are integrated in a system-on-chip.

20. The HDD of claim 17 wherein the HDC module selectively suspends caching data in the PCM based upon the PCM life estimate signal.

21. The HDD of claim 17 further comprising a wear leveling module that distributes successive memory write operations substantially uniformly across the plurality of memory cells.

22. The HDD of claim 17 further comprising a static data shifting module that selectively relocates first data within first ones of the plurality of memory cells when the first data changes less frequently than other data within other ones of the plurality of memory cells.

23. The HDD of claim 17 wherein the life monitor module monitors the plurality of the memory cells on at least one of an event basis, after a predetermined amount of time has passed, and after a predetermined number of memory writes have been performed.

24. The HDD of claim 17 further comprising second memory, wherein the HDC module selectively caches data in the second memory when the PCM is disabled.

25. The HDD of claim 24 wherein the second memory includes volatile memory.

26. A method of operating a hard disk drive (HDD), comprising:
storing at least one of user data and a computer program on a magnetic storage medium; and
caching the at least one of user data and the computer program in a phase change memory (PCM), wherein the PCM includes a plurality of memory cells that store the at least one of the user data and the computer program, wherein each of the memory cells includes a phase change material having N states, wherein N is an integer greater than or equal to three.

27. The method of claim 26 further comprising providing a hard disk assembly that includes the magnetic storage medium.

28. The method of claim 26 further comprising programming the phase change material by heating and wherein the N states correspond with N resistance ranges.

29. The method of claim 26 further comprising communicating the at least one of user data and the computer program between the PCM and a host.

30. The method of claim 26 wherein the user data includes at least one of a music file, a video file, an e-mail message, a text document, and a spreadsheet data file.

31. The method of claim 26 wherein the computer program includes at least one of a boot program, a music player program, a video coder/decoder program, an e-mail editing program, a text editing program, and a spreadsheet program.

32. The method of claim 27 further comprising switching the hard disk assembly between a full power mode and a low power mode.

33. The method of claim 32 further comprising switching the hard disk assembly to the full power mode to retrieve the at least one of the user data and the computer program from the magnetic storage medium and switching the hard disk assembly to the low power mode when the at least one of the user data and the computer program is cached in the PCM.

34. The method of claim 26 further comprising:
writing data to the plurality of memory cells at each of the N resistance states;
reading resistance values of the data at each of the N resistance states;
comparing the resistance values to thresholds corresponding to the N resistance states; and
generating a PCM life estimate signal based on the comparisons.

35. The method of claim 34 further comprising suspending caching the at least one of the user data and the computer program in the PCM based on the PCM life-estimate signal.

36. The method of claim 34 wherein the writing, reading and comparing occurs while the at least one of the user data and the computer program is cached.

37. The method of claim 35 further comprising selectively caching the at least one of the user data and the computer program in a second memory based on the PCM life estimate signal.

38. The method of claim 37 wherein the second memory includes volatile memory.

39. The method of claim 34 further comprising integrating the PCM in a system-on-chip for controlling the magnetic storage medium.

40. The method of claim 26 further comprising distributing successive memory write operations substantially uniformly across the plurality of memory cells.

41. The method of claim 26 further comprising selectively relocating first data within first ones of the plurality of memory cells when the first data changes less frequently than other data within other ones of the plurality of memory cells.

42. A method of operating a hard disk drive (HDD), comprising:
storing at least one of user data and a computer program on a magnetic storage medium;
caching the at least one of user data and the computer program in a phase change memory (PCM), wherein the PCM includes a plurality of memory cells that store the at least one of the user data and the computer program, wherein each of the memory cells includes a phase change material having N states, wherein N is an integer greater than or equal to three;
writing data to the plurality of memory cells at each of the N resistance states;
reading resistance values of the data at each of the N resistance states;
comparing the resistance values to thresholds corresponding to the N resistance states; and
generating a PCM life estimate signal based on the comparing.

43. The method of claim 42 further comprising communicating the at least one of user data and the computer program between the PCM and a host.

44. The method of claim 42 further comprising integrating the PCM in a system-on-chip for controlling the magnetic storage medium.

45. The method of claim 42 further comprising selectively caching data in the PCM based upon the PCM life estimate signal.

46. The method of claim 42 further comprising distributing successive memory write operations substantially uniformly across the plurality of memory cells.

47. The method of claim 42 further comprising selectively relocating first data within first ones of the plurality of memory cells when the first data changes less frequently than other data within other ones of the plurality of memory cells.

48. The method of claim 42 further comprising monitoring the plurality of the memory cells on at least one of an event basis, after a predetermined amount of time has passed, and after a predetermined number of memory writes have been performed.

49. The method of claim 42 further comprising selectively caching the at least one of the user data and the computer program in a second memory when the PCM is disabled.

50. The method of claim 49 wherein the second memory includes volatile memory.

51. The method of claim 42 wherein the user data includes at least one of music data, video data, e-mail message data, text document data, and spreadsheet data.

* * * * *